June 30, 1959 U. CASALE 2,892,422
MACHINE FOR SHAPING ALREADY RAISED DOUGH INTO BREAD
STICKS OF THE TYPE CALLED "GRISSINI"
Filed May 10, 1955 2 Sheets-Sheet 2
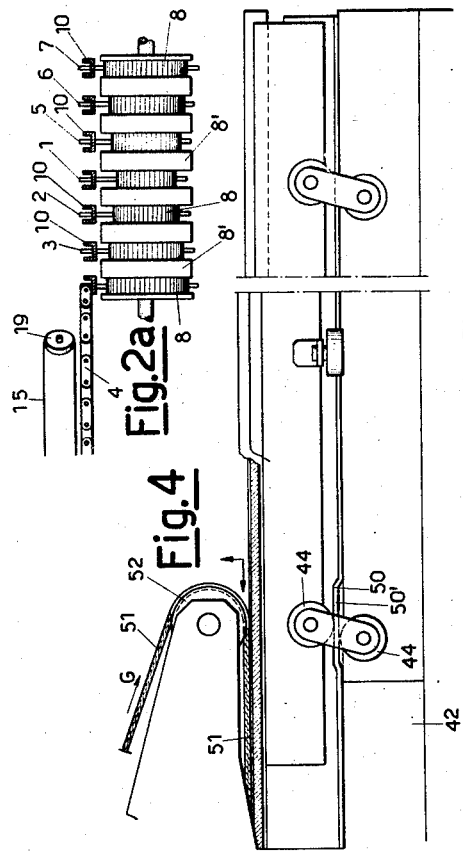
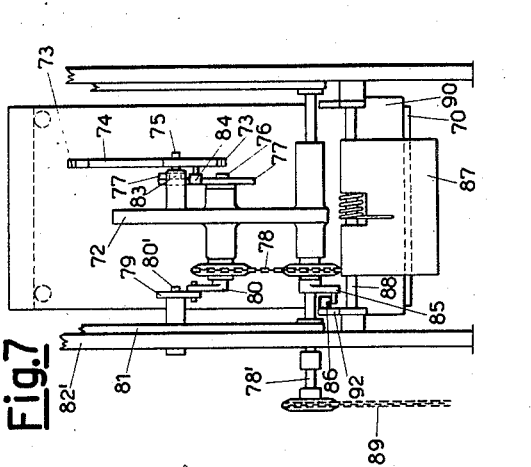
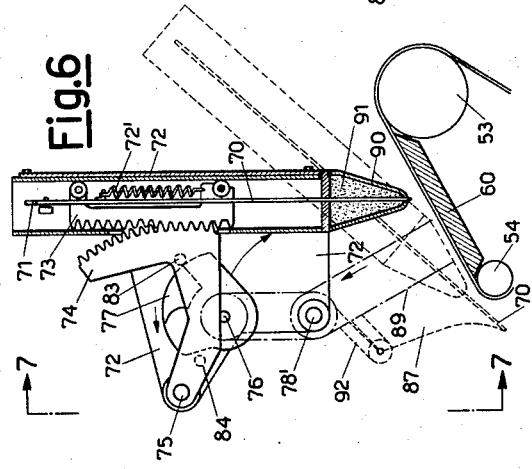
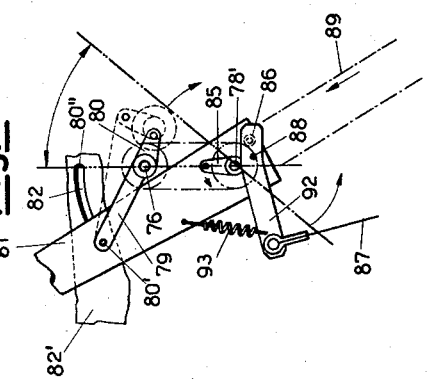

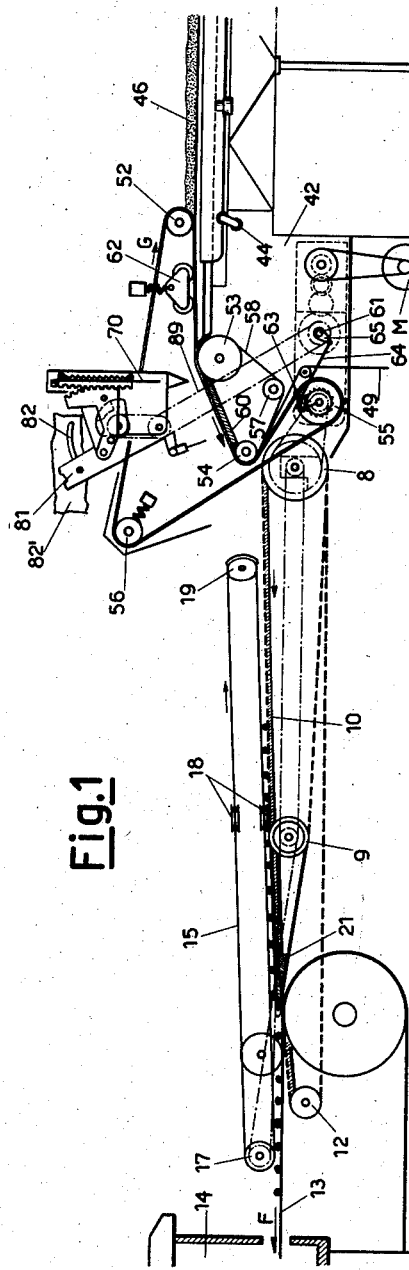
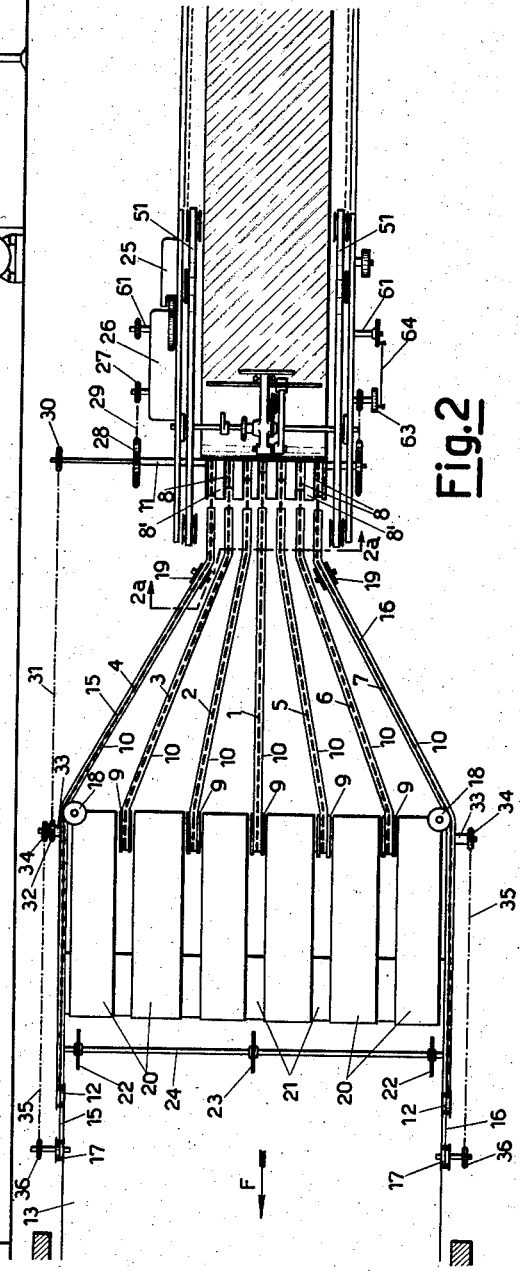

United States Patent Office 2,892,422
Patented June 30, 1959

2,892,422

MACHINE FOR SHAPING ALREADY RAISED DOUGH INTO BREAD STICKS OF THE TYPE CALLED "GRISSINI"

Umberto Casale, Voghera, Italy

Application May 10, 1955, Serial No. 507,361

Claims priority, application Italy, May 11, 1954

7 Claims. (Cl. 107—4)

All the machines hitherto adopted for the manufacture of the bread sticks called "grissini" cut an unraised dough, which arrives at the machine in the form of a band, into a number of strips of preselected length, then arranges the strips on suitable trays where they are allowed to raise before entering the baking oven. Said machines do not allow for the manufacture of the "grissini" with raised dough: this operation is presently performed by hand, and the bread sticks so made are highly appreciated for, after baking, they are very light and have a cellular structure in their inner part.

It is an object of the present invention to provide a machine for shaping "grissini" by stretching pieces of already raised dough, said machine being characterized in that it comprises a drawing device essentially consisting of a number of endless, flexible filiform elements, arranged so as to increasingly diverge from each other while advancing: said elements being mounted, like transmission ropes, to connect two rows of rollers or pulleys rotating about two substantially parallel axes located at a certain distance from each other, means being provided to have both ends of the dough sticks adhering to the outermost filiform elements during the whole divergent path and also means to remove the stretched bread sticks from the filiform elements as soon as the divergent path has been traversed, i.e. as soon as the stretching has been completed.

The filiform elements, which may consist of articulated chains, travel in a longitudinal direction, all of them lying substantially in the same plane, and moving at different advance speeds, i.e. at increased speed as divergency from the line of advance increases; so that the axis of the dough piece while being drawn, will be in a straight line transversely of all the filiform elements.

Other features will be apparent from the following description which refers to one of the practicable embodiments, by way of example only, reference being had to the accompanying drawings, wherein:

Figures 1 and 2 show, in diagrammatical ways an elevational and a plan view, respectively, of the machine;

Fig. 2a is a section taken along lines 2a—2a in Fig. 1;

Figures 3 and 4 show, in an enlarged scale, a cross-sectional and a side elevational view, respectively, of the advance carriage of the dough before the cutting operation;

Fig. 5 is a detailed side view of the driving mechanism of the dough severing device of the machine;

Fig. 6 is another view of the dough severing mechanism and shows in some details the mechanism for actuating the cutting blade;

Fig. 7 is a further side view of the dough cutting mechanism.

The essential device of the machine is the one for drawing the dough and is composed of a number of filiform elements 1, 2, 3, 4, 5, 6, 7, every one of which is arranged like an endless ring, which travel between two rows of pulleys 8 and 9, the axes of said pulleys being substantially parallel: the upper parts of said filiform elements in that part of their upper lap which runs between the pulleys 19 and 9 on the channel-shaped guides 10 (Fig. 2) lie substantially in the same plane, and diverge from each other in a longitudinal direction indicated by the arrow F. Said filiform elements, for instance in the form of articulated chains, have their upper portions travelling within channel-shaped fixed guides 10, the lateral walls of which have a height less than the height of the filiform elements, so that the top surface of the chains protrude beyond the top edge of the channel shaped guides.

To impart to the filiform elements speeds which increase as their divergency with respect to the central element 1 speed, the sprocket surface of the driving pulleys 8, keyed on shaft 11, have larger diameters as their distance from the center line of the machine increases, as can be seen in Fig. 2. Thus at the location of the pulleys 8, the outermost filiform elements 4 and 7 are at a relatively highest level and the central filiform element 1 at a relatively lowest level. The guides 10 are disposed in such a way as to bring all the inner elements onto the level of the outermost elements, thus forming a horizontal plane. The plurality of pulleys 8 are provided in addition to the sprocket surfaces with cylindrical side faces 8' of equal diameter, the function of which is to space the filiform elements properly and to lead them into the guides 10. The speeds are chosen so that the points, on which the dough stick lies transversely on the different filiform elements, all are in a straight line when the drawing operation is completed, in correspondence to pulleys 9. Only the two outermost filiform elements 4 and 7 (Fig. 2) are prolonged beyond the level of the pulleys 18 and 9, and reach the pulleys 12 whereupon the direction of travel of said filiform elements 4 and 7 is reversed, and the axes of said filiform elements are located slightly lower than the conveyor belt 13 which latter picks up and carries the stretched dough sticks directly into the baking oven 14, as can be seen in Fig. 1.

Above the lateral filiform elements 4 and 7 and at a little distance therefrom, the wires 15 and 16 travel, like endless rings, supported by pulleys 17, 18, 19: the lowermost parts of said wires which are near the filiform elements have the same speed and the same direction of advance. A great exactness is not required, since it is enough that the ends of the strips of dough be pinched between the upper laps of the filiform elements 4 and 7 and the wires 15 and 16.

In order to remove the stretched dough stick from the filiform element, a conveying device is provided, formed of cloth strips 20 (or of other material suited to prevent the sticking of the raised dough), which travel between pulleys 9, and a tensioning wedge 21 which is approximately tangent to the conveyor belt 13.

On a shaft 24 the cutting discs 22, and possible intermediate cutters 23, are keyed, in order to separate the two ends of the stretched dough sticks which were pressed between wires 15–16 and the lateral filiform elements 4–7 and to cut the remainder in preselected lengths. Discs, or, more accurately, their peripheral edges are in frictional contact with the upper lap of the conveyor belt 13 so that the advance movement of the conveyor belt 13 rotatably drives said cutting discs.

The stretching device receives continuous motion from the main motor M which, through a gear-box 26 and the chain transmissions 27—28—29 actuates shaft 11 on which pulleys 8 are keyed, through transmission 30—31—32 shaft 33 of the conveying strip device 20 is actuated; and, through the chain transmissions 34—35—36 pulleys 12 are actuated and thus drive wires 15—16 wound thereon, these wires being wound at the opposed ends, on the idle pulleys 18 and 19.

The stretching device is combined with a device for advancing and cutting the dough. This advancing and cutting device has: a flat surface 41 fixed to the frame 42 of the machine. Over the guides 41' of said flat surface a carriage 43 travels by means of rollers 44. Between the lateral flanges 43' of said carriage an interchangeable table 45 is slidably mounted and over said table a cloth band 49 is laid, on which the raised dough mass 46 rests.

Guides 41' have a raised and sloped portion 50—50', so that, when rollers 44 travel thereover, the front part of carriage 43 and table 45 are raised, thus bringing cloth 49 into contact with the endless belts 51 which travel at the two sides of the machine, in the direction of arrow G.

The endless belt 51, mounted on rollers 52, 53, 54, 55 and 56 drives the cloth by friction contact when the carriage 43 and table 45 are raised by forward movement of the carriage over the inclined surfaces 50—50'. The cloth 49 extends from the carriage 43 to a conveyor belt 58 which has a flat surface 60, whose width is equal to the width of cloth 45. The conveyor belt 58 is driven by belts 51, by means of friction, over the idler rollers 53, 54 and 57. The cloth passing over the carriage 43 and the conveyor belt 58 carries the dough 46 forward.

The pressure member 62 serves to ensure the contact of belts 51 with cloth 49: this pressure member 62 consists, for example of two rollers mounted on a frame and tensioned by a spring, as diagrammatically shown in Fig. 1. Belts 51 receive an intermittent motion only from roller 55 by means of the rocking ratchet 63 driven by the connecting rod 64 and by crank 65 which receives motion from shaft 61.

Co-acting with surface 60 there is the device for cutting the dough into small portions, said device being formed with a blade 70 driven to slide within a slot of a frame 72 by a rack-driven carriage 73 connected to the blade by means of spring 72', the rack being meshed with the toothed sector 74 which latter is fulcrumed at 75 on the frame 72, while the whole frame 72 oscillates about axis 78'. During its stroke, blade 70 passes through cup 90 affixed to frame 72 and filled with cotton, or other material, imbibed with water.

On the same frame 72 there is mounted a shaft 76 with a cam 77, which is rotatably driven by shaft 78' through chain 78.

Shaft 76 is linked, through levers 79—80, to the pivot 80' affixed to a lever 81 fulcrumed on shaft 78' and which can have either the position shown in Fig. 5, when the cutting device is to be actuated, or the position in which pivot 80' is in 80", at the end of slot 82, in guide plate 82' when the cutting device is idling.

The toothed sector 74, through its rollers 83 and 84, alternatively urged by the cam faces of cam 77, oscillates about axis 75. Shaft 78' bears also eccentric 85 which, rotating and cooperating with roller 86 causes the oscillation of lever 92 fulcrumed at 88 and fitted with a return spring 93, said lever bearing a blade-wiper 87 made of yielding material, which has the purpose of approaching blade 70 during its stroke and of easing the removal of the blade from the cut dough.

Main shaft 78' of the cutting device derives its motion from shaft 61, coming out of the gear-box, through chain transmission 89.

In Figures 5 and 6 the full line indicates the position of the blade and of the blade-wiper at the beginning of the cutting stroke, while the dotted line indicates the position at the end of the cutting stroke when cutting has been completed and the dough has fallen over filiform elements 1 . . . 7.

The operation of the machine is as follows:

After having brought from the chamber in which the dough has been raised, a table 45 with cloth top 49 on which the dough mass 46 is resting, the table is laid over carriage 43, which is then slid over rails 43' until rollers 44, connected to said table, are lifted on slope 50—50'. At this point the table is stopped while the cloth, with the dough thereover, is pressed between belts 51 and conveyor belt 58 and is intermittently advanced until dough is carried under blade 70 which, at every stroke, transversely cuts and removes from the dough mass a strip of dough which falls over filiform elements 1 . . . 7.

Said dough strip, after having passed over the parallel portion of the filiform elements, is carried over the point in which the filiform elements begin to diverge, the transverse ends of the dough strip are caught and pinched between wires 15 and 16 and the underlying filiform elements 4 and 7, so that advancing together with said filiform elements, the dough strip is gradually stretched in width until it reaches the line of pulleys 9.

Here the dough strip is lifted over the cloth strips 20, thus leaving the intermediary filiform elements, but its ends are still caught by the filiform elements and the overlying wires, until the stretched dough strip reaches the baking flat 13 and travels over it, passing under cutting discs 22 and 23 which cut it in the desired length before entering the oven.

What I claim is:

1. A machine for shaping bread sticks of the type called "grissini" characterized in that it comprises a device for the gradual mechanical stretching of the individual dough strips obtained by cutting raised dough, said device essentially consisting of a plurality of flexible filiform endless elements, diverging from each other in the form of a fan, the upper part of said elements travelling, between two rows of pulleys mounted on two axes set parallel and spaced from each other, means being provided to maintain the two ends of each dough strip joined to the two filiform outermost elements of the device along the whole divergent path and also means for removing the said dough strips from said filiform elements at the end of the travel, and for then laying said dough strips on a baking flat which advances towards an oven.

2. A machine according to claim 1, characterized in that the filiform elements travel, between suitable fixed guides shaped in the form of channels the lateral walls of which have a smaller height than the height of said filiform elements.

3. A machine according to claim 1, characterized in that the filiform elements are articulated chains.

4. A machine according to claim 1, characterized in that the filiform elements derive their motion all from a driving shaft on which said pulleys are arranged parallel to each other, said pulleys having different diameters, said diameters increasing as the divergency of the filiform elements driven by said pulleys increases.

5. A machine according to claim 1, characterized in that the means provided in order to maintain the dough strips joined to the outermost filiform elements along the divergent path are filiform endless elements the lower parts of which are parallel and overlying the correspondent filiform elements at a distance smaller than the thickness of the dough strip, so that the ends of said dough strips are pressed between two pairs of filiform elements.

6. A machine according to claim 1 characterized in that at the end of the divergent path the dough strip passes over a conveyor belt formed from material which prevents the sticking of the raised dough, said conveyor belt laying the dough strip on the baking flat on which the dough is cut before entering the baking oven.

7. A machine according to claim 1, characterized in that the device for stretching the dough is coupled with a device for advancing and cutting the raised dough mass, said latter device comprising a ratchet mechanism to perform an intermittent advancement and a blade which is actuated when the advancement of the dough is stopped.

References Cited in the file of this patent

UNITED STATES PATENTS

| | | |
|---|---|---|
| 1,527,262 | Martin | Feb. 24, 1925 |
| 2,545,667 | Malanti | Mar. 20, 1951 |
| 2,660,134 | Bertrand | Nov. 24, 1953 |

FOREIGN PATENTS

| | | |
|---|---|---|
| 996,453 | France | Aug. 29, 1951 |